3,824,139
PLASTICS LAMINATE
Gareth Jay, Ware, and Edward Wardman, Hitchin, England, assignors to Imperial Chemical Industries Limited, London, England
No Drawing. Filed Aug. 18, 1972, Ser. No. 281,798
Int. Cl. B32b 5/18
U.S. Cl. 156—79                                6 Claims

ABSTRACT OF THE DISCLOSURE

Making foam/film laminates by coextruding a layer of plastics material forming a non-foamed film and a layer containing water as a foaming agent, preferably with the addition of a small proportion of a gas-generating substance, and bringing the layers into contact while still in a heat-softened state, preferably before extrusion.

---

This invention relates to laminates comprising two or more layers of plastics film.

It has previously been proposed to form laminates comprising at least one layer of a foamed plastics film produced by the use of an organic foaming agent, and at least one layer of a non-foamed film, the laminates being produced either by coextrusion or by bonding the separate films together. It has also been proposed to foam plastics material, especially in making moulded articles, with the use of water as the foaming agent. However, water has generally been regarded as unsatisfactory as a foaming agent for making foamed films.

We have now found that, by using water as the foaming agent in the production of laminates of foamed and non-foamed films by coextrusion, particularly attractive effects may be obtained. Moreover, the process may be more economically operated.

In accordance with the present invention, therefore, a method of making a plastics-film laminate comprises coextruding at least one layer of plastics material forming a non-foamed film and at least one layer of plastics material containing water as a foaming agent, the layers being brought together before they have cooled from a molten or heat-softened state.

We have further found that a particularly attractive foam structure may be obtained, and may be obtained in a more consistent and reproducible manner, if, in addition to the water, there is added a small proportion of a substance that generates a gas at or below the temperature of extrusion. The amount may be so small that, in the absence of the water, it produces no visible effect in the product.

In accordance with a preferred form of the method of the invention, therefore, the layer of plastics material containing water as a foaming agent also contains as ubstance that generates a gas at or below the temperature of extrusion, the water and said substance being present in a ratio of from 20:11 to 4:1, by weight.

In the absence of the gas-generating substance the foam layer tends to be formed with a relatively small number of relatively large cavities, generally occurring as holes through the foam layer, which may be desirable for some purposes. We have found that a reduction in the amount of water present (still in the absence of a gas-generating substance) generally results in the formation of a smaller number of voids of much the same size. Within this generalisation, the particular structure of the foam may be affected to some extent by the presence of other substances in the plastics composition, for example by the presence of pigments or other colouring materials. In the presence of a gas-generating substance, however, reduction of the water content (but with the proportion of gas-generating substance to water remaining constant) appears not to reduce the number of voids, but merely to reduce their size; the nature of the product is found to be more controllable, and less affected by the presence of pigments or other ancillary substances, than when no gas-generating substance is present.

Suitable gas-generating substances include any of those known as foaming agents for plastics materials, such as, for example: azodicarbonamide, azodiisobutyronitrile, benzenesulphonhydrazide, p,p'-oxybis-benzenesulphonhydrazide, p-toluene sulphonyl semicarbazide, dinitroso pentamethylene diamine.

It is of course possible to make, by the use of these foaming agents alone, laminates similar to those produced by the method of the present invention. However, by using the method of the invention, the amount of such foaming agent (and hence the costs of the process) may be very substantially reduced. Moreover, because the amount of such foaming agent used is so small, it does not complicate the reuse of scrap produced in the process and of off-cuts produced in the subsequent fabrication of the laminates.

The laminates are preferably formed by coextrusion through a common die, preferably by a tubular extrusion in which the two or more layers are fed by separate extruders through concentric orifices into an extrusion head, and combine at, or preferably in advance of, the extrusion orifice. Equipment for extruding multi-layer films is well known and readily available; such equipment may generally be used without modification for making the laminates of the invention.

The layers for forming the laminates may alternatively be extruded through separate die orifices and combined immediately after extrusion; the success of this method however will depend upon the structure of the foamed layer and the risk of tearing, particularly in foams of more open or irregular structure.

The method of the invention is particularly useful for making laminates from olefine polymers, for example polyethylene, polypropylene, or copolymers of ethylene or propylene with another olefine or with another monomer, for example with vinyl acetate or methyl methacrylate. Preferably, the same plastics material is used for the film and foam layers, but different materials may be used if desired.

The water, and the gas-generating substance if used, may be mixed with the polymer granules before extrusion by any convenient method, for example by tumble-blending or by feeding the water as a drip or spray into the hopper of the extruder, concurrently with the polymer granules (which may have been previously mixed with a desired amount of gas-generating substance) and at a controlled rate adjusted to the rate of feeding the polymer granules. The proportion of water added, or of water with gas-generating substance, affects the structure of the solidified foam.

As previously indicated, the use of water alone tends to give a rough-surfaced, irregular layer with cavities in its surface often extending through the foam layer to expose the underlying film layer, the number of cavities generally depending on the amount of water used. The preferred proportion of water, generally from 0.5 to 6%, by weight, of the plastics material, will thus be selected to give the desired distribution of cavities These rough-surfaced layers, despite their irregular and pitted appearance, can provide attractive products, especially in 2-layer laminates; in particular they may be used to produce colour effects, especially when the two layers are differently colored. They may be used, for example, in the production of carrier-bags of attractive appearance. The rough-surfaced foams also show much increased resistance to slipping and skidding, compared with smoothsurfaced films, and are thus useful for making, for example, non-slip sacks.

When a gas-generating substance is used, in addition to water, the laminates usually have a more delicate appearance, although rough-surfaced laminates, with holes through the foam layer, may be produced when relatively large amounts of water are used. The proportion of water will again generally range from about 0.5% to 6%, by weight, of the plastics material. An amount of gas-generating substance equal to from about 1/18 to about 1/12 of the amount of water, by weight, will generally give very satisfactory results.

The thickness of the layers forming the laminates is preferably from 35 to 150 microns, although the thickness of the foam layer will of course increase after extrusion, usually to two or three times the original thickness of the layer. The stated range of thickness will provide materials ranging from those suitable for making, for example, small carrier-bags to those suitable for making heavy-duty sacks. The separate layers may be of the same or of different initial thickness.

When the laminate is produced by the tubular film extrusion process, it may immediately after extrusion be blown to the desired lay-flat width by an enclosed bubble of gas, in the same way as a normal tubular film. The foam layer will generally be on the outside, since this will usually be required in fabricating bags or other articles from the laminates. It will of course be essential when the foam is such that the cavities form apertures in the foamed film; otherwise the foam layer will be insufficiently stretched by the enclosed air and will not be brought wholly into contact with the non-foamed film. The take-off rate may also be adjusted, to provide a desired amount of longitudinal stretching.

Our invention is illustrated but in no way limited by the following Examples, in which parts given are by weight.

EXAMPLE 1

100 parts of polyethylene having a specific gravity of 0.92 and a melt flow index of 1.0 were mixed with 2 parts of water by tumble-blending. The mixture was fed to a 2.5 inch screw extruder and extruded through the downstream entry orifice of a 2-layer tubular film extrusion head, while the same polyethylene, but without added water, was similarly extruded by an identical extruder through the upstream orifice, so that the two layers were extruded concurrently and coaxially through the tube-forming die, with the non-foaming layer innermost. The output of both extruders was adjusted to 100 lbs./hour and the temperature of the melt extruded at the tube-forming die was 190° C. The tube-forming die had a diameter of 10 inches and a die gap of 0.03 inch; the blow ratio was 2.5, and the take-off rate was 42 ft./min. The laminate was air-cooled immediately after extrusion and during blowing, by means of a conventional air cooling system as used in the production of tubular polyethylene film. The laminate had a rough surface and was of attractive appearance, with the cavities produced in the foam extending in many cases through the foam to expose the underlying film.

EXAMPLE 2

100 parts of polyethylene having a density of 0.92 and a melt flow index of 1.0 were mixed, by tumble-blending, with 1 part of water and 7 parts of a polyethylene masterbatch containing white pigment. Also added to this mixture was 1/4 part of a foam-producing low density polyethylene masterbatch containing 25% of azodicarbonamide ("Genitron" AC, Registered Trademark). The mixture was fed to a 2.5 inch screw extruder and extruded through the downstream entry orifice of a 2-layer tubular film extrusion head, while the same polyethylene without the additions was similarly extruded by an identical extruder through the upstream orifice, so that the two layers were extruded concurrently and coaxially through the tube-forming die, with the non-foaming layer innermost. The output of both extruders was adjusted to 100 lbs./hour and the temperature of the melt extruded at the tube-forming die was 190° C. The tube-forming die had a diameter of 10 inches and a die gap of 0.03 inch; the blow ratio was 2.5, and the take-off rate was 42 ft./min. The laminate was air-cooled immediately after extrusion and during blowing, by means of a conventional air cooling system as used in the production of tubular polyethylene film. The resulting laminate had a rough outer surface produced by a considerable number of fairly small voids, approximately 1/8 inch in diameter, which penetrated right through the white outer layer. The inner layer was composed of a see-through natural film layer so that the overall laminate had the appearance of white lace.

Although the invention has been described with particular reference to 2-layer laminates, it may be applied to the production of laminates containing more than two layers, especially 3-layer film/foam/film laminates.

We claim:

1. A method of making a plastics-film laminate which comprises coextruding at least one layer of plastics material forming a non-foamed film and at least one layer of plastics material containing water as a foaming agent and a substance that generates a gas at or below the temperature of extrusion, the water and said substance being present in a ratio of from 20:1 to 4:1, by weight, and bringing the layers together before they have cooled from a molten or heat-softened state.

2. A method according to Claim 1 in which the laminates are formed by tubular coextrusion through a common die in which the two or more layers are fed by separate extruders through concentric orifices into an extrusion head and combine at or in advance of the extrusion orifice.

3. A method according to Claim 1 in which the laminate is produced by a tubular film extrusion process with the foam layer on the outside, and immediately after extrusion it is blown to the desired lay-flat width by an enclosed bubble of gas.

4. A method according to Claim 1 in which the laminates are made from olefine polymers.

5. A method according to Claim 1 in which the proportion of water is from 0.5 to 6%, by weight, of the foamable plastics material.

6. A method according to Claim 5 in which the gas generating substance is present in an amount equal to from about 1/18 to about 1/12 of the amount of water, by weight.

References Cited
UNITED STATES PATENTS

| | | | |
|---|---|---|---|
| 3,186,889 | 6/1965 | Boldrini et al. | 260—2.5 P |
| 3,399,098 | 8/1968 | Omoto et al. | 260—2.5 E X |
| 3,546,143 | 12/1970 | Corbett | 260—2.5 E |
| 3,692,602 | 9/1972 | Okada et al. | 156—79 |
| 3,705,834 | 12/1972 | Terry | 156—79 X |

EDWARD G. WHITBY, Primary Examiner

U.S. Cl. X.R.

156—244; 260—2.5 R, 2.5 E, 2.5 P, 2.5 HA

UNITED STATES PATENT OFFICE
CERTIFICATE OF CORRECTION

Patent No. 3,824,139                     Dated July 16, 1974

Inventor(s) Jay Gareth and Edward Wardman

It is certified that error appears in the above-identified patent and that said Letters Patent are hereby corrected as shown below:

In the Heading:

Please insert --Foreign Application Priority Data
April 10, 1972      United Kingdom       16398/72--

Column 1, line 57 "20:11" should read --20:1--.

Signed and Sealed this

Ninth Day of May 1978

[SEAL]

Attest:

RUTH C. MASON
Attesting Officer

LUTRELLE F. PARKER
Acting Commissioner of Patents and Trademarks